United States Patent [19]

Sanderson

[11] 3,907,647

[45] Sept. 23, 1975

[54] COMBINATION PETRI DISH AND ISOLATOR

[76] Inventor: Dewey S. C. Sanderson, 4890 Troy St., Denver, Colo. 80239

[22] Filed: Aug. 15, 1973

[21] Appl. No.: 388,550

[52] U.S. Cl. .................................. 195/139; 195/139

[51] Int. Cl. .................................. C12k 1/10

[58] Field of Search .................................. 195/139

[56] References Cited

UNITED STATES PATENTS

| | | | |
|---|---|---|---|
| 3,308,039 | 3/1967 | Nelson | 195/139 |
| 3,632,478 | 1/1972 | Fink | 195/139 |
| 3,696,002 | 10/1972 | Grimes et al. | 195/139 |

*Primary Examiner*—Lionel M. Shapiro

*Assistant Examiner*—Robert J. Warden

*Attorney, Agent, or Firm*—Bertha L. MacGregor

[57] ABSTRACT

The combination petri dish and isolator is a self-contained device which comprises a lower open top box-like container and a cover that closes the top and fits over the lower member. The lower member is divided by a partition into a smaller chamber for storing an isolator or spreader fastened to the inner surface of the top of the cover, and a larger area chamber containing culture media. The cover is raised to be moved manually over the lower member, with the isolator in spreading contact with the culture media and micro-organisms deposited thereon, whereby growth of the micro-organisms on the culture media in separate colonies is facilitated.

3 Claims, 7 Drawing Figures

COMBINATION PETRI DISH AND ISOLATOR

This invention relates to a combination petri dish and isolator for use in culturing bacteria and other micro-organisms.

Petri dishes heretofore used for containing the culture media are round, shallow dishes in which the media, such as agar-agar, or other growth inducing nutritive substances, commonly are in a gelatinous layer on which the bacteria, other micro-organisms and various fungi are deposited by laboratory and hospital technicians for the purpose of culturing the bacteria and other micro-organisms. It has been customary to provide for use with the petri dishes, a streaking loop consisting of an elongated handle having a wire loop mounted on one of its ends, for the purpose of streaking the exposed media surface and spreading thereon the bacteria or other microorganisms referred to as the inoculum.

The described procedure is objectionable because it requires two separate devices, namely, the petri dish and the streaking loop. The streaking loop must be sterilized prior to re-use, and, further, the streaking step of the process may vary as to the extent of the streaking of the media and spreading on the media surface.

The combination petri dish and isolator of this invention is designed to overcome the objections noted, and to provide a single container for the culture media, the inoculum, and the spreader means which serves to isolate the inoculum for efficient growth in colonies and subsequent macroscopic and/or microscopic examination. The isolator, or spreader means of the invention, serves to spread the inoculum over the entire surface of the media, a result not obtainable by use of the prior art streaking loop.

Figure 1:
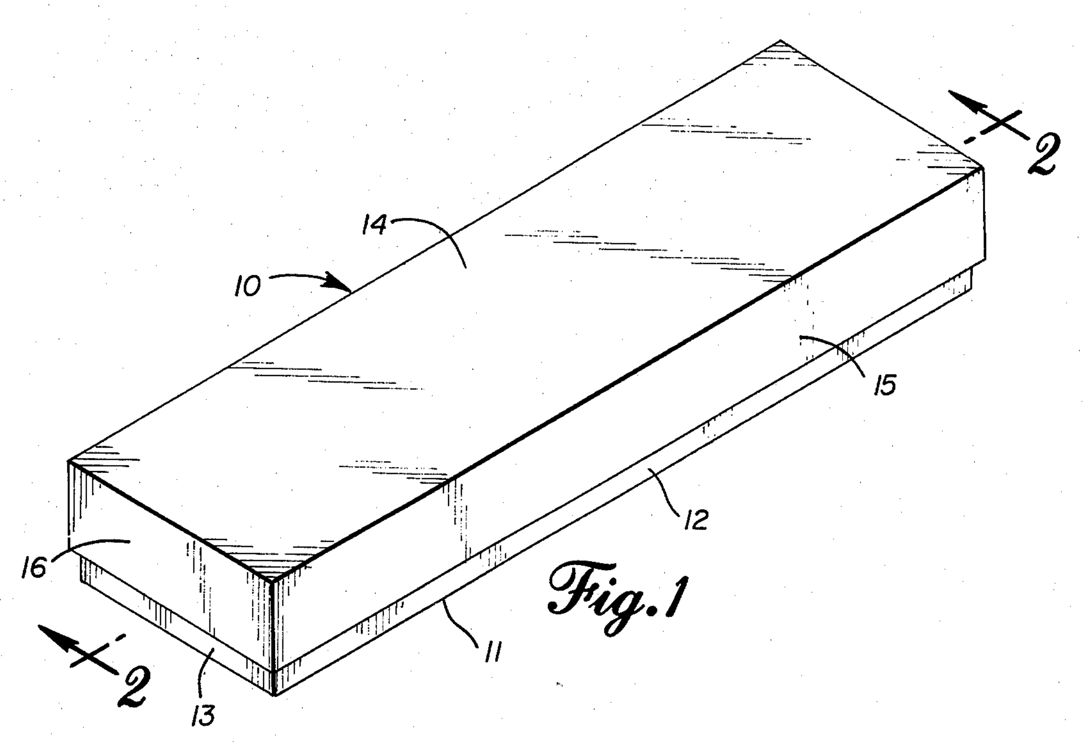
FIG. 1 is an isometric view of a combination petri dish and isolator embodying my invention.
Figure 2:
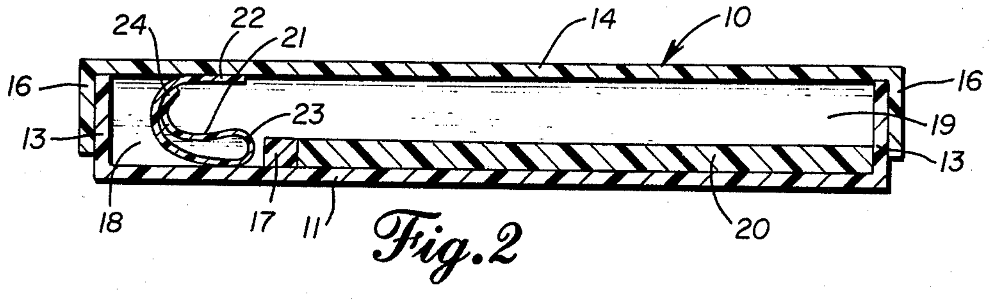
FIG. 2 is a longitudinal vertical sectional view in the plane of the line 2—2 of FIG. 1.

In the embodiment of the invention shown in the drawings, the container 10 comprises a lower open top box member having a flat bottom 11, two vertical side walls 12 and two vertical end walls 13, and a cover having a top 14, two side walls 15 and two end walls 16, dimensioned to fit over the lower member. As shown, the container 10 is rectangular in shape, approximately 5½ inches long and 1½ inches wide, but the container may be square or other shape and have other dimensions. Although "box" has been defined as a "receptacle or case usually six sided and rectangular," the term is used herein to describe an open top member and cover which may be rectangular, square or round.

A partition 17 extends transversely across the bottom 11 from side wall 12 to the opposite side wall 12, at a short distance from one of the end walls 13, to divide the lower member of the container into a chamber 18 at one end and a major area 19 within which the culture media 20 is located. The chamber 18 accommodates the isolator 21 which spreads the inoculum (not shown) on the culture media 20.

Figure 3:
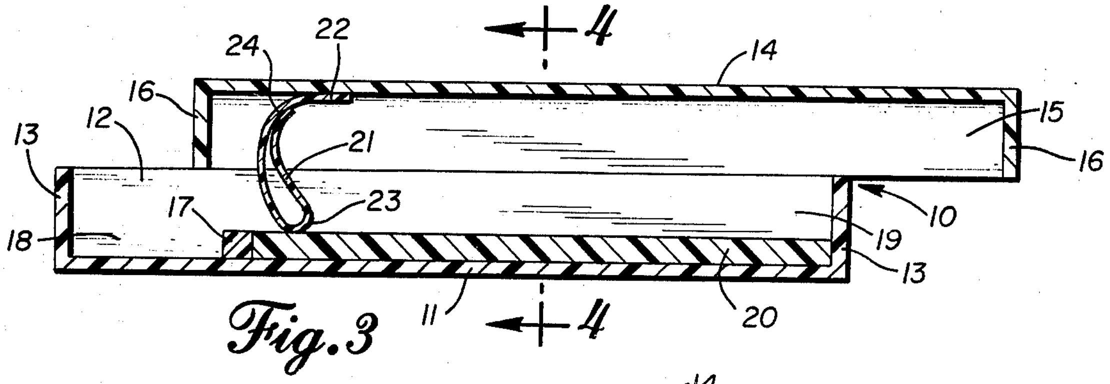
FIG. 3 is a view similar to FIG. 2, but showing the cover raised and the isolator in position to spread inoculum over the entire surface of the culture media in the container when the cover is moved to the right of FIG. 3 in the plane shown.
Figure 4:
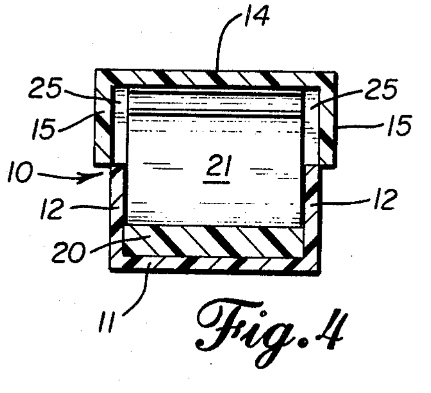
FIG. 4 is a transverse vertical sectional view in the plane of the line 4—4 of FIG. 3.
Figure 5:
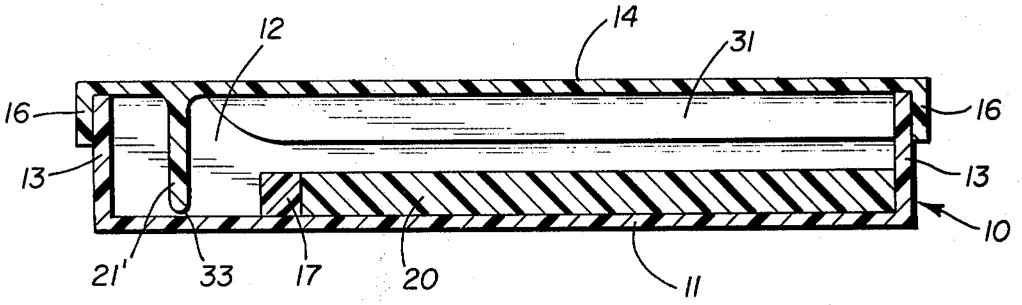
FIG. 5 is a longitudinal vertical sectional view of a modified construction of the combination petri dish and isolator embodying the invention.
Figure 6:
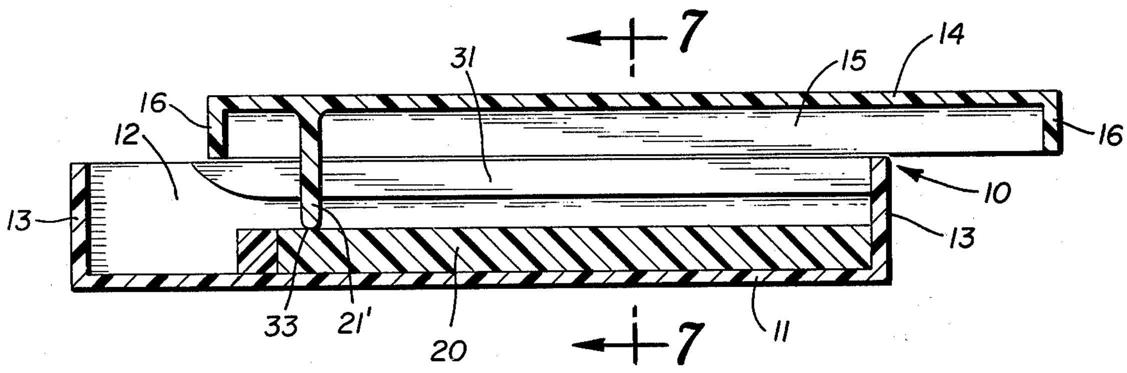
FIG. 6 is a view similar to FIG. 5, but showing the cover raised and the isolator in position to spread inoculum over the entire surface of the culture media in the container when the cover is moved to the right in FIG. 6 in the plane shown.
Figure 7:
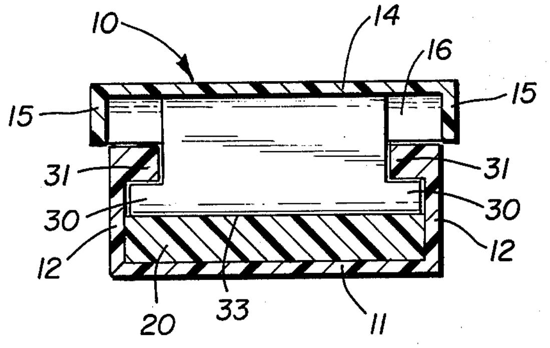
FIG. 7 is a transverse vertical sectional view in the plane of the line 7—7 of FIG. 6.

The isolator 21 may be made of plastic material in sheet form, as shown in FIGS. 1–4, or it may be molded and be fastened to or integral with the cover top 14, as shown in FIGS. 5–7, described hereinafter. The isolator 21 shown in FIGS. 1–4 has one longitudinal edge 22 fastened to the lower surface of the cover top 14, the remainder of the sheet being folded on itself as indicated at 23 and stitched or adhesively fastened as indicated at 24 to form a flexible spreader which extends across the container between the cover side walls 15 but spaced therefrom so that it can depend at 23 downwardly into the lower member from one side wall 12 to the other side wall 12. As shown in FIG. 4, spaces 25 between side edges of the spreader or isolator 21 and the cover side walls 15 are provided for this purpose. The material of which the isolator 21 is made is such that it exerts slight pressure on the media 20 (and the inoculum thereon) but does not penetrate it when moved over the media surface.

The modification shown in FIGS. 5–7 shows the isolator 21' made of molded material integral with the cover top 14 but it may be made separately and be fastened to the cover. In this modification, the isolator 21' projects outwardly at its side edges as indicated at 30, for cooperation with rails 31 formed on or fastened to the inner surfaces of the sides 12 of the container 10. The lower edge 33 of the isolator 21' resembles the curved edge 23 of the isolator 21 shown in FIGS. 1–4 and serves to spread the inoculum, and is guided into its preferred operating position by the cooperating rails 31 and projections 30.

The technician using the combination petri dish and isolator of this invention is thus provided with a completely self contained device which contains and encloses the culture medium and an isolator movable over media and micro-organisms thereon in spreading contact therewith by manually passing the cover of the container from left to right as shown in FIG. 3. Thus the entire procedure is sanitary, confined to use of a single device which eliminates the need for use of a separate streaking loop. Further, the rectangular shape of the container (as distinguished from the round petri dishes now in use) facilitates spreading of the inoculum over the entire surface of the media efficiently, allowing colonies of micro-organisms to develop in isolated areas on the culture media as is essential for macroscopic identification.

I claim:

1. A combination petri dish and isolator for culturing micro-organisms and the like comprising a. a container consisting of a lower box-like member and a cover therefor, b. an isolator on the cover extending downwardly into the lower member of the container, and c. a partition in the lower member dividing the member into a storage chamber for reception of the isolator and a larger chamber containing culture media, d. said cover being liftable to be movable over said lower member with the isolator in spreading contact with the culture media for spreading micro-organisms deposited thereon, said isolator being a sheet of plastic material having an edge portion fastened to the lower surface of the cover and having a portion folded upon itself forming a curved surface for spreading contact with the culture media in the lower member of the container.

2. The device defined by claim 1, in which the isolator curved surface exerts slight pressure on the culture media when passed over the media surface, but does not penetrate the media.

3. A combination petri dish and isolator for culturing micro-organisms and the like comprising a. a container consisting of a lower box-like member and a cover therefor, b. an isolator on the cover extending downwardly into the lower member of the container, and c. a partition in the lower member dividing the member into a storage chamber for reception of the isolator and a larger chamber containing culture media, d. said cover being liftable to be movable over said lower member with the isolator in spreading contact with the culture media for spreading micro-organisms deposited thereon, said isolator being flexible, permitting deformation for storage in the storage chamber when the cover is in its lower position on the container lower member, and automatic extension into media contacting form when the cover is raised for movement over the media in the container lower member.

* * * * *